US009960928B1

(12) United States Patent
Pope et al.

(10) Patent No.: US 9,960,928 B1
(45) Date of Patent: May 1, 2018

(54) SYSTEM AND METHOD FOR TOPIC-BASED EVENTING FOR FLEXIBLE SYSTEM MANAGEMENT

(75) Inventors: Nick George Pope, Suwanee, GA (US); Flemming S. Andreasen, Marlboro, NJ (US); Qi Wang, Shanghai (CN); Jerry Liansuo Li, Shanghai (CN)

(73) Assignee: Cisco Technology, Inc., San Jose, CA (US)

(*) Notice: Subject to any disclaimer, the term of this patent is extended or adjusted under 35 U.S.C. 154(b) by 273 days.

(21) Appl. No.: 13/543,769

(22) Filed: Jul. 6, 2012

Related U.S. Application Data

(60) Provisional application No. 61/505,358, filed on Jul. 7, 2011.

(51) Int. Cl.
| | | |
|---|---|---|
| G06F 15/16 | (2006.01) |
| G06F 12/00 | (2006.01) |
| G06F 17/00 | (2006.01) |
| H04N 21/00 | (2011.01) |
| H04L 12/28 | (2006.01) |

(52) U.S. Cl.
CPC .. H04L 12/2816 (2013.01); *H04L 2012/2849* (2013.01)

(58) Field of Classification Search
CPC ........ H04L 2012/6483; H04N 21/2743; H04N 21/25; H04N 21/266; H04N 21/00
USPC ................. 709/225, 205, 206, 207
See application file for complete search history.

(56) References Cited

U.S. PATENT DOCUMENTS

| | | | |
|---|---|---|---|
| 5,754,771 A | 5/1998 | Epperson et al. |
| 7,650,505 B1 | 1/2010 | Masurkar |
| 8,104,066 B2 | 1/2012 | Colsey et al. |
| 8,327,019 B2 | 12/2012 | Gould et al. |
| 8,468,271 B1 | 6/2013 | Panwar et al. |
| 9,330,190 B2 * | 5/2016 | Sundstrom .......... G06F 17/3089 |
| 2005/0048961 A1 | 3/2005 | Ribaudo et al. |
| 2005/0177750 A1 | 8/2005 | Gasparini et al. |
| 2006/0130069 A1 | 6/2006 | Srinivasan et al. |
| 2006/0174277 A1* | 8/2006 | Sezan ................... H04N 7/163 725/46 |
| 2007/0080823 A1 | 4/2007 | Fu et al. |
| 2007/0094304 A1* | 4/2007 | Horner .................. G06Q 10/10 |

(Continued)

FOREIGN PATENT DOCUMENTS

| | | |
|---|---|---|
| CN | 103782571 A | 5/2014 |
| WO | WO2013/006839 | 1/2013 |
| WO | WO2013/006844 | 1/2013 |

OTHER PUBLICATIONS

A Lightweight Agent Fabric for Service Autonomy, 2007.*

(Continued)

*Primary Examiner* — Kevin Bates
*Assistant Examiner* — Mark A Scott
(74) *Attorney, Agent, or Firm* — Merchant & Gould P.C.

(57) ABSTRACT

A method is provided in one example embodiment and includes establishing a connection between a client and a messaging fabric of a conductor element associated with a video system; creating a plurality of nodes for system management events; and receiving a subscription request for a particular one of the system management events. The particular subscription request and system management event is authenticated and authorized by use of an identifier associated with the particular subscription request and system management event.

20 Claims, 9 Drawing Sheets

(56) References Cited

U.S. PATENT DOCUMENTS

| | | | |
|---|---|---|---|
| 2007/0107019 A1 | 5/2007 | Romano et al. | |
| 2007/0113269 A1 | 5/2007 | Zhang | |
| 2008/0034097 A1* | 2/2008 | Nomura | H04L 29/12009 709/227 |
| 2008/0065775 A1 | 3/2008 | Polk | |
| 2008/0140709 A1* | 6/2008 | Sundstrom | H04L 67/24 |
| 2008/0192770 A1* | 8/2008 | Burrows et al. | 370/466 |
| 2008/0275982 A1 | 11/2008 | Busch et al. | |
| 2008/0292074 A1 | 11/2008 | Boni et al. | |
| 2009/0067441 A1* | 3/2009 | Ansari et al. | 370/401 |
| 2009/0168787 A1* | 7/2009 | Ansari et al. | 370/401 |
| 2009/0177782 A1 | 7/2009 | Blatherwick et al. | |
| 2009/0228584 A1* | 9/2009 | Maes | G06F 9/542 709/224 |
| 2009/0241104 A1 | 9/2009 | Amiga et al. | |
| 2009/0292773 A1* | 11/2009 | Leedberg | G06F 17/3089 709/205 |
| 2009/0319611 A1* | 12/2009 | Turakhia | H04L 12/1822 709/204 |
| 2010/0005171 A1 | 1/2010 | Arolovitch | |
| 2010/0057680 A1* | 3/2010 | Little | G06F 17/3089 707/E17.014 |
| 2010/0057835 A1* | 3/2010 | Little | H04L 67/16 709/203 |
| 2010/0150139 A1* | 6/2010 | Lawson | H04L 12/66 370/352 |
| 2010/0158476 A1 | 6/2010 | Hao et al. | |
| 2010/0162294 A1* | 6/2010 | Yin et al. | 725/30 |
| 2010/0202450 A1* | 8/2010 | Ansari et al. | 370/389 |
| 2010/0211678 A1 | 8/2010 | McDysan et al. | |
| 2010/0231790 A1 | 9/2010 | Ansari et al. | |
| 2010/0242079 A1* | 9/2010 | Riedl et al. | 725/115 |
| 2010/0287609 A1* | 11/2010 | Gonzalez | G06F 21/10 726/14 |
| 2010/0299187 A1 | 11/2010 | Duggal | |
| 2010/0322264 A1* | 12/2010 | Liimatta | H04L 45/00 370/412 |
| 2010/0325260 A1* | 12/2010 | Halla-Aho | G06F 17/30516 709/224 |
| 2011/0030018 A1 | 2/2011 | Mizuno et al. | |
| 2011/0055893 A1* | 3/2011 | Walls | H04L 65/1069 726/3 |
| 2011/0099228 A1* | 4/2011 | Smith | 709/205 |
| 2011/0103265 A1* | 5/2011 | Dilipkumar Saklikar | H04L 63/0815 370/259 |
| 2011/0113122 A1 | 5/2011 | Drope | |
| 2011/0126296 A1 | 5/2011 | Moore | |
| 2011/0252082 A1 | 10/2011 | Cobb et al. | |
| 2011/0289496 A1* | 11/2011 | Steer | G06F 8/65 717/169 |
| 2011/0295942 A1* | 12/2011 | Raghunath | H04L 45/00 709/203 |
| 2011/0295966 A1* | 12/2011 | Morris | H04L 67/2895 709/207 |
| 2011/0307623 A1 | 12/2011 | George et al. | |
| 2011/0320575 A1 | 12/2011 | Pope et al. | |
| 2011/0320585 A1 | 12/2011 | Pope et al. | |
| 2011/0321062 A1* | 12/2011 | Pope | G06Q 30/02 719/318 |
| 2012/0011207 A1* | 1/2012 | Morris | 709/206 |
| 2012/0079066 A1* | 3/2012 | Li | H04L 67/26 709/217 |
| 2012/0084356 A1* | 4/2012 | Ferdi | H04L 65/1016 709/204 |
| 2012/0174157 A1* | 7/2012 | Stinson et al. | 725/40 |
| 2012/0209926 A1* | 8/2012 | Backholm et al. | 709/206 |
| 2012/0246295 A1* | 9/2012 | Gonzalez-Banos | H04L 67/14 709/224 |
| 2012/0304233 A1 | 11/2012 | Roberts et al. | |
| 2012/0304245 A1* | 11/2012 | Lawson | H04L 63/0807 726/1 |
| 2012/0311038 A1 | 12/2012 | Trinh et al. | |
| 2013/0007813 A1 | 1/2013 | Baskaran et al. | |
| 2013/0013688 A1 | 1/2013 | Wang et al. | |
| 2013/0013698 A1 | 1/2013 | Relyea et al. | |
| 2013/0013704 A1 | 1/2013 | Pope et al. | |
| 2013/0083906 A1 | 4/2013 | Roberts et al. | |
| 2014/0201645 A1* | 7/2014 | Mo | G06F 17/30058 715/738 |
| 2014/0335823 A1* | 11/2014 | Heredia | H04L 51/38 455/411 |

OTHER PUBLICATIONS

"XMPP PubSub," White Paper, Isode, Jul. 13, 2011, 6 pages http://www.isode.com/whitepapers/xmpp-pubsub.html.

Brand, Richard, et al., "IPTV Content on Demand Service Architecture," an ATIS Webinar, Apr. 21, 2011, 26 pages.

Millard, Peter, et al., "XEP-0060: Publish-Subscribe," Jul. 12, 2010, © 1999-2012 XMPP Standards Foundation, 240 pages http://xmpp.org/extensions/xep-0060.html.

Nawrocki, Mike, "ATIS IPTV Standards Development via ATIS' IPTV Interoperability Forum (IIF)," GSC-16 Halifax Canada 2011, 67 pages.

Thompson, B., et al., "ATIS Internet Sourced Content Initiative and Relevance to CDNI," Network Working Group Internet Draft draft-thompson-cdni-atus-scenarios-00, Mar. 29, 2011, 16 pages.

USPTO Jul. 3, 2013 Non-Final Office Action from U.S. Appl. No. 13/543,754.

USPTO Jul. 12, 2013 Non-Final Office Action from U.S. Appl. No. 13/543,775.

USPTO Aug. 2, 2013 Response to Jul. 12, 2013 Non-Final Office Action from U.S. Appl. No. 13/543,775.

USPTO Aug. 19, 2013 Final Rejection from U.S. Appl. No. 13/543,775.

D. Harrington, et al., "An Architecture for Describing Simple Network Management Protocol (SNMP) Management Frameworks," Network Working Group, RFC 3411, Dec. 2002, 64 pages; http://www.ietf.org/rfc/rfc3411.txt.pdf.

R. Gerhards, "The Syslog Protocol," Network Working Group, RFC 5424, Mar. 2009, 38 pages; http://www.ietf.org/rfc/rfc5424.txt.pdf.

Barth, "HTTP State Management Mechanism," Internet Engineering Task Force (IETF), RFC 6265, Apr. 2011, 37 pages; http://www.ietf.org/rfc/rfc6265.txt.pdf.

U.S. Appl. No. 13/543,754 entitled System and Method for Cross-Screen Experiences and Companion Device Services in a Video Architecture filed Jul. 6, 2012, Inventor(s): Flemming S. Andreasen,et al.

U.S. Appl. No. 13/543,775 entitled System and Method for Unified Metadata Brokering and Policy-Based Content Resolution in a Video Architecture filed Jul. 6, 2012, Inventor(s): Neil Black,et al.

U.S. Appl. No. 13/543,780 entitled System and Method for Content Access Protection and Session Tracking With Adaptive Bitrate filed Jul. 6, 2012, Inventor(s): David Stuart Morgan,et al.

PCT Oct. 10, 2012 International Search Report and Written Opinion from International Application PCT/US2012/045858; 10 pages.

PCT Oct. 24, 2012 International Search Report and Written Opinion from International Application PCT/US2012/045851; 10 pages.

Lubke, Robert, et al., "MobilisGroups: Location-based group formation in Mobile Social Networks," Pervasive Computing and Communications Workshops (PERCOM Workshops), 2011 IEEE International Conference on, IEEE, Mar. 21, 2011.

Schuster, Daniel, et al., "Service-based development of mobile real-time collaboration aplications for Social Networks," Pervasive Computing and Communications Workshops (PERCOM Workshops(, 2010 8$^{th}$ IEEE International Conference on, IEEE, Piscataway, NJ, USA, Mar. 29, 2010; 6 pages.

U.S. Appl. No. 14/166,202 entitled System and Method for Cross-Screen Experiences and Companion Device Services in a Video Architecture filed Jan. 28, 2014, Inventor(s): Flemming S. Andreasen,et al.

PCT Jan. 7, 2014 International Preliminary Report on Patentability from International Application PCT/US2012/045858; 6 pages.

PCT Jan. 7, 2014 International Preliminary Report on Patentability from International ApplicationPCT/US2012/045851; 7 pages.

(56) References Cited

OTHER PUBLICATIONS

Uspto Mar. 6, 2014 Non-Final Office Action from U.S. Appl. No. 13/543,620.
USPTO Mar. 7, 2014 Non-Final Office Action from U.S. Appl. No. 13/543,692.
USPTO Nov. 10, 2013 Notice of Allowance from U.S. Appl. No. 13/543,754.
USPTO Dec. 17, 2013 Non-Final Office Action from U.S. Appl. No. 13/543,775.
USPTO Mar. 25, 2014 Final Office Action from U.S. Appl. No. 13/543,775.
USPTO May 1, 2014 Non-Final Office Action from U.S. Appl. No. 13/543,780.
Ma et al., "A Lightweight Agent Fabric for Service Autonomy," IBM China Research Lab, SOCASE 2007, May 2007; LNCS 4504, pp. 63-77.
USPTO Dec. 19, 2014 Non-Final Office Action from U.S. Appl. No. 13/543,620.
USPTO Jan. 5, 2015 Non-Final Office Action from U.S. Appl. No. 13/543,692.
USPTO Jan. 8, 2015 Non-Final Office Action from U.S. Appl. No. 14/166,202.
USPTO Dec. 30, 2014 Non-Final Office Action from U.S. Appl. No. 13/543,780.
USPTO Aug. 11, 2014 Final Office Action from U.S. Appl. No. 13/543,620.
USPTO Aug. 11, 2014 Final Office Action from U.S. Appl. No. 13/543,692.
USPTO Jul. 17, 2014 Notice of Allowance from U.S. Appl. No. 13/543,775.
Lee, Cody, "How to use AirPlay® with your iPhone®," iDownloadBlog, Mar. 11, 2011; 6 pages http://www.idownloadblog.com/2011/03/11/how-to-use-airplay-with-your-iphone/.
Hornsby, et al., "XMPP-Based Wireless Sensor Network and Its Integration Into the Extended Home Environment," Sep. 2009, IEEE 978-1-4244-2976-9/09, p. 795-797.
USPTO Oct. 2, 2015 Non-Final Office Action from U.S. Appl. No. 13/543,620.
USPTO Sep. 11, 2015 Non-Final Office Action from U.S. Appl. No. 13/543,692.
USPTO Apr. 20, 2015 Final Office Action from U.S. Appl. No. 13/543,620.
USPTO Jun. 8, 2015 Final Office Action from U.S. Appl. No. 14/166,202.
USPTO May 6, 2015 Final Office Action from U.S. Appl. No. 13/543,780.
PRC Feb. 3, 2016 SIPO First Office Action from Chinese Application Serial No. CN201280043457.
USPTO Mar. 24, 2016 Final Office Action from U.S. Appl. No. 13/543,620.
USPTO Mar. 25, 2016 Non-Final Office Action from U.S. Appl. No. 13/543,692.
USPTO Nov. 24, 2015 Final Office Action from U.S. Appl. No. 14/166,202.
USPTO Mar. 7, 2016 Notice of Allowance from U.S. Appl. No. 14/166,202.
USPTO Nov. 30, 2015 Non-Final Office Action from U.S. Appl. No. 13/543,780.

* cited by examiner

SYSTEM AND METHOD FOR TOPIC-BASED EVENTING FOR FLEXIBLE SYSTEM MANAGEMENT

CROSS-REFERENCE TO RELATED APPLICATION

This application claims the benefit of priority under 35 U.S.C. § 119(e) to U.S. Provisional Application Ser. No. 61/505,358, entitled "VIDEOSCAPE SYSTEM PLATFORM" filed Jul. 7, 2011, which is hereby incorporated by reference in its entirety.

TECHNICAL FIELD

This disclosure relates in general to the field of communications and, more particularly, to a system and a method for system and method for topic-based eventing for flexible system management.

BACKGROUND

Service providers face difficult challenges in the context of providing video services for a diverse group of end users. Many service providers are gearing up to implement their 'TV Everywhere' initiatives, which can offer a level of freedom being demanded by consumers today. One aspect of this demand includes the ability to access content from any device at any time and from any location. Providing an effective integration of various technologies, while accounting for specific device options, specific location possibilities, specific user preferences, specific content and programming, etc. is a significant challenge for service providers.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DETAILED DESCRIPTION OF EXAMPLE EMBODIMENTS

Overview

A method is provided in one example embodiment and includes establishing a connection (e.g., wired, wireless, etc.) between a client and a messaging fabric of a conductor element associated with a video system; and creating (e.g., defining, providing, etc.) a plurality of nodes (e.g., any suitable piece of hardware, software, application, etc.) for system management events. The events can include any appropriate occurrence, trigger, function, operation, task, or activity associated with video. The method also includes receiving a subscription request for a particular one of the system management events. The particular subscription request can be authenticated and authorized by use of an identifier associated with the subscription request and the particular system management event.

In more particular embodiments, each of the nodes are configured based on a particular service, a type of system management event, and an event severity level. In other implementations, the method can include establishing a service connection to the conductor element to enable message exchanges with the client, the service connection establishes an Extensible Messaging and Presence Protocol (XMPP)-based service. The method could also include generating a new system management event; forwarding the new system management event to a particular one of the plurality of nodes based on the subscription request; and authenticating and authorizing the new system management event using an identifier associated with the new system management event.

In more detailed implementations, the method can include flagging a portion of the plurality of system management events as persistent such that they are stored in persistent storage. The method could also include forwarding a particular group of events to a collection node, which forwards the group of events based on a plurality of subscriptions. Additionally, the method could include providing a plurality of filters as part of a subscription to limit certain events from notifying certain nodes. Certain example implementations may include creating a particular system management event in order to perform one or more load-balancing operations.

Example Embodiments

Figure 1:
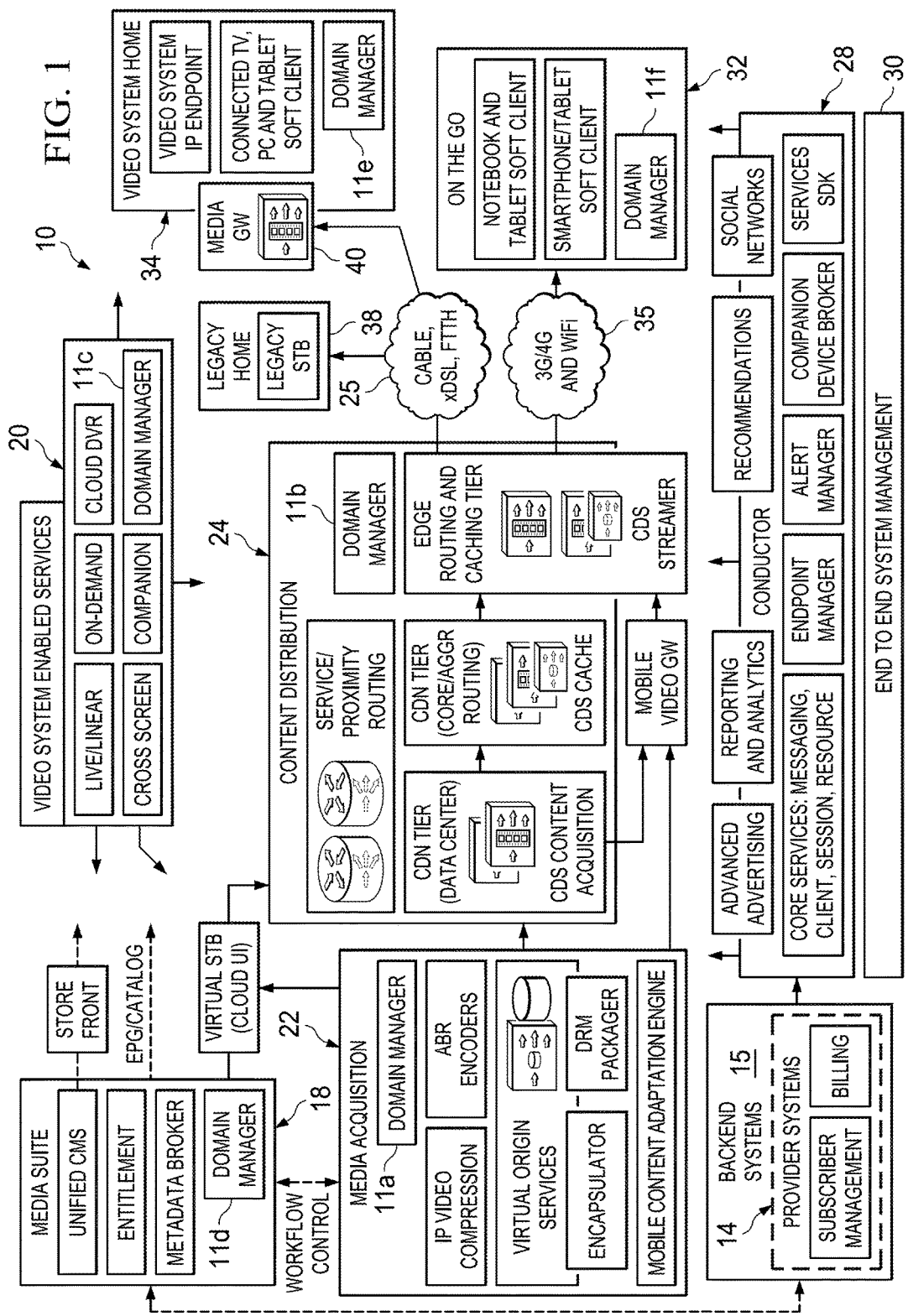
FIG. 1 is a simplified block diagram of a video system for providing a video platform in accordance with one embodiment of the present disclosure.

Turning to FIG. 1, FIG. 1 is a simplified block diagram of a video system 10 configured for providing an integrated video platform in accordance with one embodiment of the present disclosure. Video system 10 may include a plurality of backend systems 15, which may further include a number of provider systems 14 that are inclusive of subscriber management and billing. In addition, video system 10 may include a media suite 18 for content and metadata management, which may be coupled to a media acquisition 22 for content processing. A video system enabled services element 20 may be suitably linked to media suite 18, media acquisition 22, and a content distribution 24.

Additionally, any number of networks may suitably couple content distribution 24 to a video system home 34, as well as an "on the go" component 32, which may be associated with wireless activities, roaming, WiFi, end-user devices more generally, etc. In one particular example being illustrated in FIG. 1, a 3G/4G and WiFi network 35, along with a cable, xDSL, FTTH network 25 are being used to facilitate the activities of the video platform. FIG. 1 also includes a conductor 28 video control plane, which can be suitably coupled to media acquisition 22, content distribution 24, and an end to end system management 30. Note that the larger blocks of FIG. 1 (e.g., conductor 28, content distribution 24, media suite 18, video system enabled services 20, vide system home 34, media acquisition, 22, etc.) can be viewed as logical suites that can perform certain activities of the present disclosure. Note that their functions, responsibilities, tasks, capabilities, etc. can be distributed in any suitable manner, which may be based on particular video needs, subscription models, service provider arrangements, etc.

In accordance with the teachings of the present disclosure, video system 10 is configured to offer service providers a number of valuable features. For example, video system 10 is configured to extend video services to a variety of devices ranging from smartphones, tablets, iPads, personal computers (PCs), to set-top boxes (e.g., n-screen), cable systems, etc. Additionally, this platform of video system 10 is configured to extend video services to any IP access network (un-tethering). The architecture can also provide unified content management between different devices, different networks, and different video services. Additionally, the architecture can provide a flexible platform and infrastructure that enables existing services to be modified (and for new services to be developed by the service provider) by leveraging a combination of Internet protocol (IP), hypertext transfer protocol (HTTP)/web-services, Extensible Messaging and Presence Protocol (XMPP) and a workflow-enabled infrastructure with open interfaces and both client and server software development kits (SDKs). An initial set of applications can also be provided (e.g., linear, time-shift, on-demand, etc.).

Additionally, the architecture can use adaptive bitrate (ABR) to facilitate video service delivery (independent of the access). This allows a video offering that can be targeted at consumers, which can offer "Anywhere, Any Access" that may be tied to subscription models. In addition, video system 10 can readily support unicast and multicast delivery with in-home cache optimizations for more efficient use of access network resources. This can include support for content protection, thereby enabling delivery of all content (not merely a subset of content). This also includes support for existing critical features such as Emergency Alert Service, Blackouts, Geo-Blocking, etc. Support is also provided for advertising (including dynamic ad support) and for legacy devices (primarily existing endpoint devices (e.g., set-top boxes (STBs)) for a smooth migration of existing infrastructure.

The architecture can also support hybrid optimizations for access providers to implement (e.g., in order to enhance their offering). In this context, hybrid is referring to the combination of traditional service provider video delivery technologies (e.g., MPEG transport stream over quadrature amplitude modulation (QAM) in a cable hybrid fiber-coaxial (HFC) environment) with pure IP video delivery technologies (e.g., HTTP-based adaptive bitrate).

In operation, communication system 10 can support the following end-user oriented use cases: 1) content discovery; 2) linear services for managed IP STBs and unmanaged devices (where migration for existing linear services is supported equally); 3) on-demand services for managed IP STBs and unmanaged devices (where migration for existing on-demand services is supported); 4) time-shifted TV services (e.g., in the form of Cloud DVR/time-shifted TV across screens for managed IP STBs and unmanaged devices (where migration for existing DVR services is supported); 5) cross-screen experience in the form of companion devices, where a companion device (e.g., iPhone) can be used as a remote control for another video system device (e.g., IP STB), or the companion device can enhance the viewing experience through value add/context or programming aware metadata information (e.g., Facebook/twitter feeds, additional program detail, hyperlinks, etc.); 6) screen-shifting, where the user is able to change playback to another device (e.g., from iPad to TV), pause and resume programs across devices, or have multi-room DVRs; 7) dynamic advertising; and 8) value add applications, which enable service providers to offer value add user experiences (e.g., such as Facebook connect capabilities, access to Olympics Applications, etc.).

Note that video services have traditionally been provided in a siloed fashion. Linear TV services were provided by Cable, Telco, or Satellite companies over legacy non-IP based infrastructures with service offerings that expanded to include time-shift, on-demand, and DVR type services. Services were offered to managed devices (e.g., a STB) on managed networks only (e.g., QAM-based cable). As IP infrastructure with relatively high bandwidth became more prevalent, a second wave of IPTV-based video systems appeared. A common theme in these systems is an IP multicast-based linear service, real-time streaming protocol (RTSP)-based on-demand (etc.) service, and a session initiation protocol (SIP)/IP multimedia subsystem (IMS) plus RSTP control plane, and/or an HTTP/web services plus RTSP based control plane coupled with metadata management (e.g., electronic program guide (EPG)) towards the end-users typically based on HTTP/web services. IPTV content delivery was generally assumed to be a fixed bitrate over managed networks (either supporting resource reservations to satisfy certain levels of service or simply having plentiful bandwidth).

A new 3rd wave of systems is now being considered with a design principle of any content to any device anywhere at any time. HTTP adaptive bitrate enables this model in the content delivery domain; however, for a service provider to provide premium video services, a control plane infrastructure is still needed. The existing IPTV based control plane architecture and solutions fall short in a number of areas needed to support the above 3rd wave systems in today's web-based environment, including: 1) a lack of consideration and service for HTTP ABR-based content delivery, which does not have the notion of a "network" or cloud session (e.g., for troubleshooting, diagnostics, statistics, policy enforcement (upper limit on sessions)), etc.; and 2) the HTTP Simple Object Access Protocol/REpresentational State Transfer (REST)(SOAP/REST) based video control plane architectures fall short in several areas. This includes an inability to work through NATs (e.g., to support notification type services to clients (emergency alerts, operator initiated messaging/diagnostics, etc.)). This also includes bidirectional communication support and a way for cloud-initiated communication to target households, users, and/or specific devices are missing (e.g., eventing), and authentication/authorization considerations around such cloud-initiated communication is missing as well. In addition, such models work as request-response protocols in the client-server computing model, and they are generally not session-stateful, which is needed for some premium video services. These HTTP-based services do not retain information or status of each user for the duration of multiple requests. Therefore, when HTTP-based web services are deployed over a large cluster, it is difficult to track the user's progress from one request to another, unless a centralized database is used to track it.

The SIP/IMS-based video control planes provide persistent connections with bidirectional support and notification services, which solve several of the shortcomings of the HTTP-based control planes. However, the SIP/IMS based architectures fall short in several other areas as well (e.g., they are defined only for SIP/IMS-based services to be invoked and advertised). In today's world, ease of integration with HTTP and XML-based services is important. Additionally, SIP/IMS is based on a call setup model, whereby services are invoked as part of an incoming or outgoing session setup. Events within or outside of a session are supported as well. As a result of this, IMS service creation, composition, and interaction relies on the notion of IMS filter criteria, which are (statically defined) trigger points used to determine which of several IMS application servers (AS) to invoke.

Interaction between multiple application servers is handled by the (under-specified) Service Capability Interaction manager (SCIM) function. It is in many ways a more modern version of the classic Intelligent Network (IN) model used for telephony systems in the past. In the 3rd wave video system and today's increasingly web-based technology world, users and services both need to be considered as first-class citizens that are equally capable of initiating service to each other. Furthermore, an open framework of orchestrating such services is important, including responses to events in the system.

With SIP/IMS being designed around the need to establish a communication session (e.g., a call), it is not well suited to exchange structured data as part of a session by itself. For example, support for large messages is an issue over user datagram protocol (UDP), and SIP proxies are in general not intended to have frequent or substantial amounts of data sent through them. However, several video control plane services need that capability (e.g., remote scheduling, companion device experiences, interactive diagnostics, etc.).

Certain embodiments of video system 10 can offer an overall video services control plane architecture that addresses the above shortcomings. In accordance with one example implementation of the present disclosure, video system 10 can resolve the aforementioned issues (and potentially others) to provide a combination of cloud, network, and client capabilities that enables the service provider to offer its subscribers any content over any network to any device. The present disclosure provides the first complete instantiation of an end-to-end video platform solution supporting the full complement of managed video service offerings.

Within the platform of FIG. 1, the functional components are logically grouped into different suites. Extending beyond the core platform are components that are assumed to be preexisting, within either the service provider or the content provider networks. Specifically, service provider Business Support Systems/Operations Support Systems (SP BSS/OSS) represents a set of preexisting business and operations support systems. 3rd party web services are cloud-based services that the solution leverages, but are preexisting and can be leveraged in-place. Content provider control systems are preexisting or future systems that support the delivery of content into secondary distribution channels. A collection of different networks (both service provider managed networks and other networks) can also be provided that play a role in the delivery of the video service. Finally, the architecture can also include existing on-demand and linear content sources, representing both the origination of that content from the content provider/broadcaster, as well as the acquisition of that content within the service provider's network. The solid and dashed lines in this area represent the distinction between content metadata and content essence (the actual media files, etc.).

The cloud paradigm can extend the media and acquisition suites with enhanced capabilities for linear and time-shifted TV. The communication platform also introduces conductor and conductor services, providing an extensible service creation environment, common service capabilities, as well as massively scalable and persistent client connection technologies. Three additional suites are also provided, which includes the ad suite (represented as 'Advanced Advertising' in FIG. 1) that provides a core set of advanced advertising capabilities that integrates a web ad decision server capabilities. In addition, an application suite (e.g., Video System Enabled Services) is provided that builds on the base soft client capability provided in QuickStart. It also provides a base set of core and value-add end-user applications across both managed and unmanaged devices. A management suite (e.g., end to end system management) is also provided for client and endpoint management; it facilitates management of the overall video platform suite of products.

Video system 10 also builds on the distribution suite capabilities for the efficient delivery of both on-demand and linear content to client devices. The content delivery network (CDN) capability can be responsible for taking content that originates from the Content management/media processing functions, and delivering it to clients at scale, efficiently, and with minimal end-to-end latency. The CDN can provide a high degree of deployment flexibility: scaling from more centralized deployments to highly-distributed deployments using centralized root caching tiers, multiple intermediate caching tiers, and edge-caching tiers close to the client devices. CDN also provides intelligent content routing capabilities that are tied, through network proximity, to the real-time routing details of the underlying network elements. This enables the service provider to efficiently deliver content from the best edge cache resource, even during periods of network impairment.

The architecture also covers soft clients as well as managed devices. Specifically, the architecture includes a video system home gateway, as well as a video system IP STB. The home gateway, as an extension of the network, provides valuable linkage between managed and unmanaged devices within the home and the service provider cloud and network infrastructures. The IP STB, as well as all soft clients running on unmanaged devices, is designed to work across managed and unmanaged network environments. Soft client capabilities can be extended to include linear and time-shift capabilities, as well as leverage the evolving set of cloud and network APIs exposed by the various suites to provide a high-quality end-to-end user experience.

Video system 10 presents a migration to an all-IP based video and services infrastructure spanning the full service/content life cycle, from the video content and metadata acquisition, to content and metadata preparation, distribution, and delivery to the end-user. The video system encompasses a set of diverse products/suites with heterogeneous interfaces and implementations for these functions. The overall system follows a Service Oriented Architecture (SOA) development framework and, hence, supports multiple individual services, which are used via service orchestration and workflow engines. Each of the suites provides a set of well-defined services and associated interfaces, and it is with these services that end-user services are eventually provided. End-user services can be defined as including one or more services that users interact with to provide a user visible service. For example, a linear TV service provides features and logic to enable users to watch a particular channel in accordance with their subscription. The linear TV service does so by use of a number of underlying video system services and suites. Application suite services play a particular role in terms of providing application logic for one or more services. Users could be machines as well (e.g., for machine-to-machine oriented type services).

In certain implementations of the present disclosure, video system 10 can leverage a set of HTTP-based RESTful web services to support basic on-demand TV everywhere capabilities. These HTTP services, exposed to end-points by both the media suite and the distribution suite, can provide proven scalability, resiliency, and extensibility. In operation, the video platform can use a mix of HTTP RESTful web services and XMPP-based services, providing a powerful combination to support the enhanced capabilities for linear, time-shift TV, VOD, companion, and value-add applications.

Figure 2:
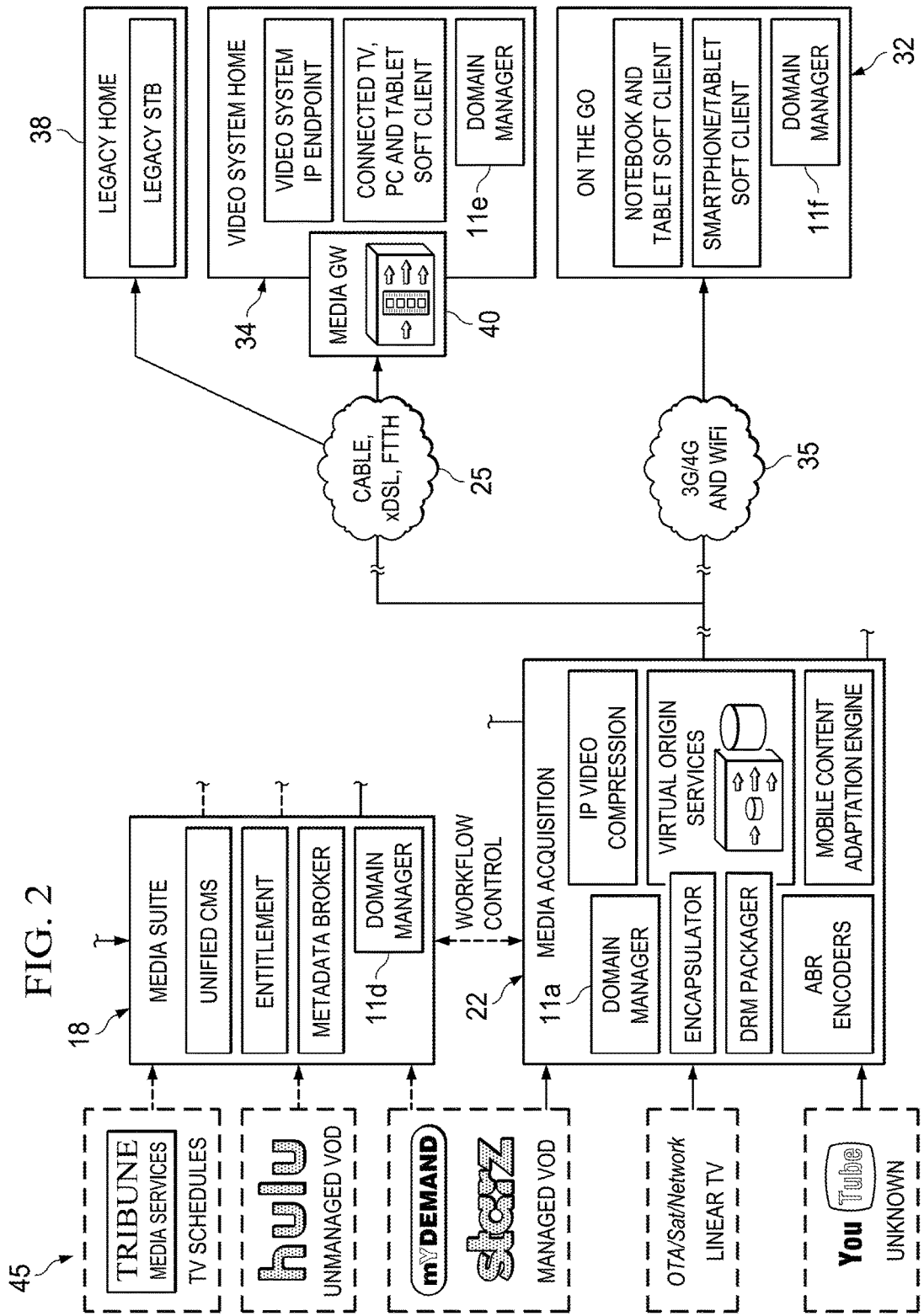
FIG. 2 is a simplified block diagram illustrating possible example details associated with one embodiment of the video system.

Turning to FIG. 2, FIG. 2 illustrates a number of example content sources 45 (e.g., YouTube, Starz, HULU, etc.). Devices and services can be divided into client-facing and cloud-facing components. Client-facing components and services can involve interaction with a client. Cloud-facing components and services can include everything else. In either case, services provide well-defined XMPP and/or HTTP-based interfaces. XMPP-based services can rely on the conductor infrastructure and the features it provides (e.g., service virtualization or persistent connections), whereas HTTP-based services in the video system can follow a standard web-services model.

Clients may interface directly with a service or they may interact with a front-end application/service, which in turns orchestrates and invokes other services (e.g., by use of the flexible workflow engine provided by service orchestration). Similarly, services may also rely on backend application logic to implement higher-level applications/services, which again may rely on service orchestration of other services. On the client itself, there may be one or more applications installed, and applications may contain add-on modules. In either case, the client-side application interacts with the video system cloud via one or more service invocations (e.g., "Create Recording" to schedule an nDVR recording, which is supported by a service or application front-end via HTTP or XMPP).

In operation, the media suite (unified CMS, entitlement, metadata broker, LSMS/EPG manager, etc.), the distribution suite (which is the content distribution that includes the service router, service engine/edge cache, etc.), the advertising suite, and the application suite can expose services that clients consume. The client-facing interfaces can be HTTP-based, and for the video system, they can continue to be HTTP-based, or they as well as other applications and services may be HTTP and/or XMPP based. In either case, efficient mechanisms can be used for clients to initially discover these services, select the instance of the component that can best fulfill service requests from that client, and manage the allocation of finite resources across all instances of that service. The video system can offer a unified service discovery capability through the conductor's service directory for both XMPP and HTTP-based services. For XMPP-based conductor services, service virtualization can be provided natively by the conductor infrastructure.

Figure 3:
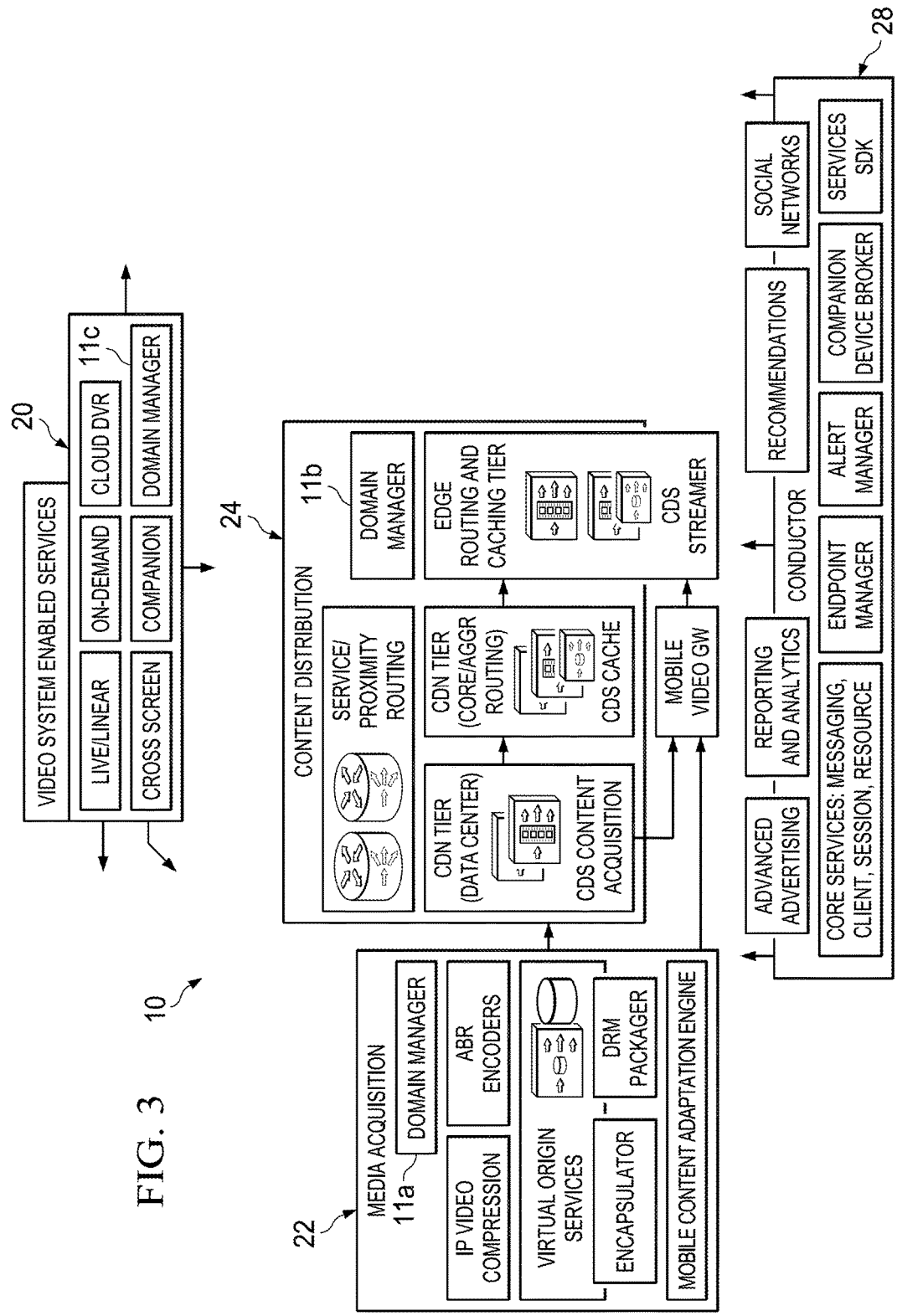
FIG. 3 is a simplified block diagram illustrating possible example details associated with one embodiment of the video system.

FIG. 3 is a simplified block diagram highlighting the video system enabled services, along with the conductor capabilities. The acquisition suite services, while not directly consumed by client endpoints, provide critical media processing services to the media suite and the distribution suite and, therefore, are also considered. Service routing and service virtualization for the media suite, the acquisition suite, and the distribution suite can continue to leverage existing implementations. Specifically, the media suite currently provides a global server loadbalancing (GSLB)/Apache web services mechanism for service virtualization and loadbalancing. The acquisition suite can provide loadbalancing for video on demand (VOD) transcoding through its transcode manager server; expanded mechanisms for service virtualization and loadbalancing for linear and VOD transcoding and encapsulation can also be provided in the video system. The distribution suite provides a service router based mechanism for virtualization and edge cache selection. The ad suite message exchanges are stateless with transaction data being maintained and replicated across the virtualized service cluster allowing any virtual endpoint to process a message exchange. For services accessed using traditional HTTP message exchanges, an appliance, or other hardware loadbalancer may be used. Alternatively, a loadbalancer or a software loadbalancer may be adopted in alignment with the overall video system architecture. When the ad suite is accessed using XMPP, the integrated video system conductor service virtualization is leveraged for loadbalancing and high availability.

Video system users can subscribe to the video services through their service provider. One or more users and devices may be associated with an account for service, and associated with each is a profile to enable personalization of the video services. Devices range from IP set-top boxes to soft clients on a variety of devices such as PCs, Macs, tablets, smartphones, etc., and all of those devices may be used either on the service provider's access network (home), or another network (e.g., on the go). Users may also have a video system home gateway, which could be a residential NAT/firewall type device with additional video features, such as media caching, and multicast-to-unicast conversion to optimize the end-user video experience and to reduce use of access network resources (especially when users have multiple devices accessing the same content). Cable and Telco (xDSL, Fiber, etc.) access networks are supported as managed networks, where quality of service and policy control enable a better end-user video experience than for unmanaged access network, that provide an over-the-top experience instead.

Users and devices can connect to the video system infrastructure using primarily persistent XMPP connections and stateless HTTP-based web services. The conductor provides the XMPP infrastructure to which clients (users/devices) connect via the connection manager and have their identity authenticated, thereby enabling a secure and personalized service experience. The conductor provides a basic set of connection management, messaging and core services, and additional services enablement features to allow for new services to be introduced. Services and applications can connect to the conductor, thereby enabling them to use the core services provided by the conductor, as well as exchange messages with each other through the XMPP messaging infrastructure.

Core services provided by the conductor include the client directory, which contains user and device profile information, and the publish-subscribe subsystem (PubSub), which enables listeners to subscribe to and be notified about events generated by publishers for a given topic. The session state manager tracks state associated with sessions (e.g., a video session when watching a movie), and the resource broker allows resources (e.g., network bandwidth), to be associated with that session. The application suite provides a set of supporting front-end and backend application logic to deliver the linear and time-shift TV, nDVR, on-demand, soft client download for certain platforms, value-added applications, and a web portal e-commerce platform for the on-demand storefront.

Figure 4:
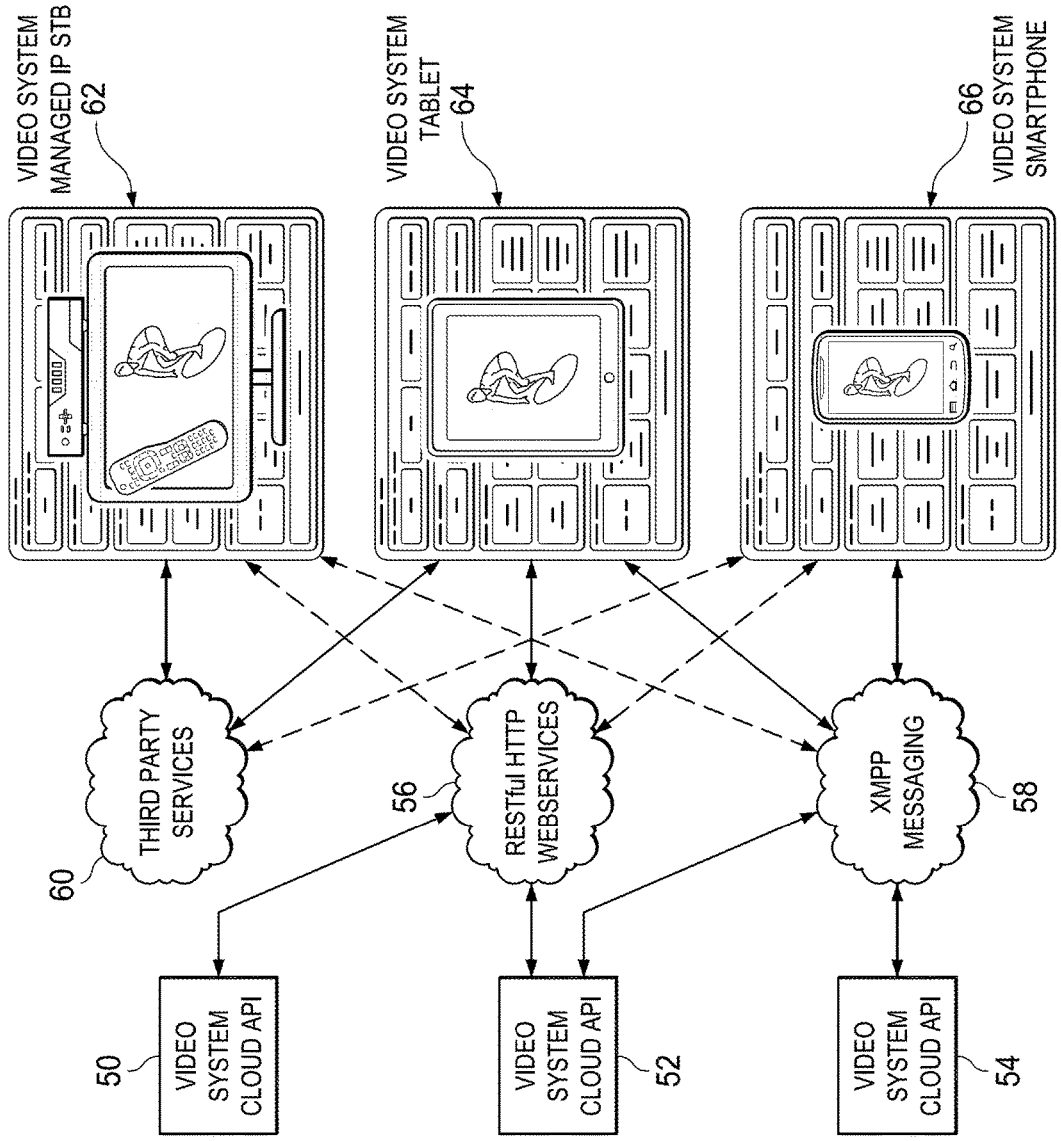
FIG. 4 is a simplified block diagram illustrating possible example details associated with one embodiment of the video system.

FIG. 4 is a simplified block diagram illustrating the video systems cloud APIs and clients. In this particular example, a video system cloud API 50 is provided as being connected to a RESTful HTTP web services network 56. In addition, other instances of a video system cloud API 52, 54 are coupled to an XMPP messaging cloud 58. An instance of third-party services 60 is also being illustrated and is coupled to a video system managed IP set-top box 62. Additionally, a video system iOS tablet 64 and a video system Android smartphone 66 are suitably connected to a given network. The cloud APIs can enable a consistent user experience. Additionally, the cloud APIs can leverage the best of XMPP and HTTP. The client SDKs can facilitate cloud API use across diverse platforms. Additionally, the cloud APIs can access third-party services.

Figure 5:
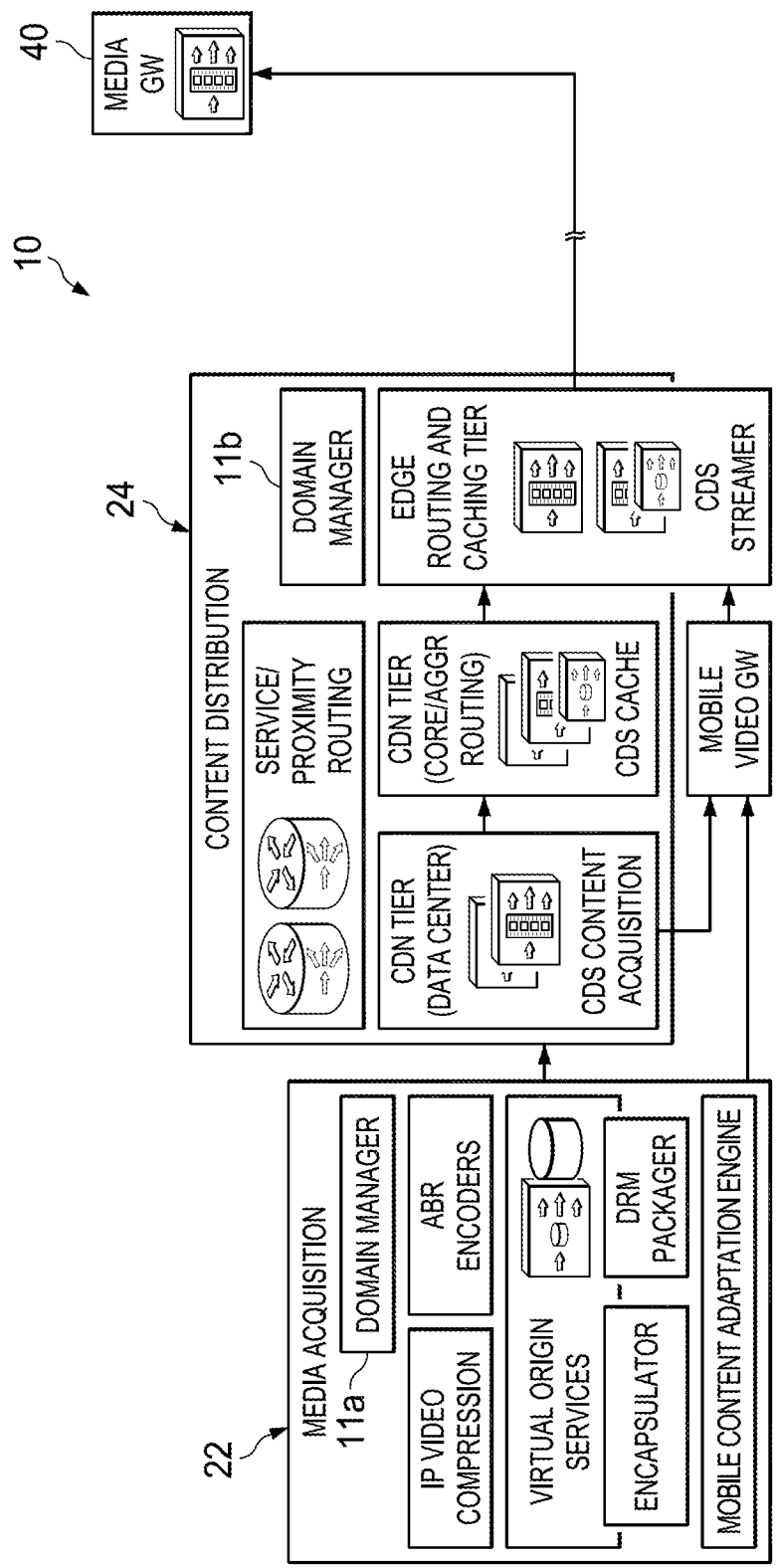
FIG. 5 is a simplified block diagram illustrating possible example details associated with one embodiment of the video system.

FIG. 5 is a simplified block diagram illustrating the content distribution suite and the media acquisition suite. In certain example implementations, the program guide retrieval and media delivery is HTTP-based. Video delivery supports adaptive bitrate, and it can utilize the distribution suite for efficient, service provider-scale video delivery. The distribution suite provides for distributed content caching throughout the network. HTTP requests for content can be sent to the service router (SR) first, which uses the proximity engine (PxE) to perform a proximity-based redirection of the HTTP request to a service engine (SE) for efficient media delivery. When the service engine receives the request, it either serves it from its cache, another service engine (higher in the caching hierarchy), or it contacts the content acquisition function, which retrieves the content from an origin server (in the acquisition suite). The distribution suite can be used for efficient delivery of any cacheable application object such as generic program guides, whereas personalized program guides may be retrieved directly from the media suite instead. In either case, clients may learn about new program guides being available by use of the PubSub XMPP service for program guide updates.

Figure 6:
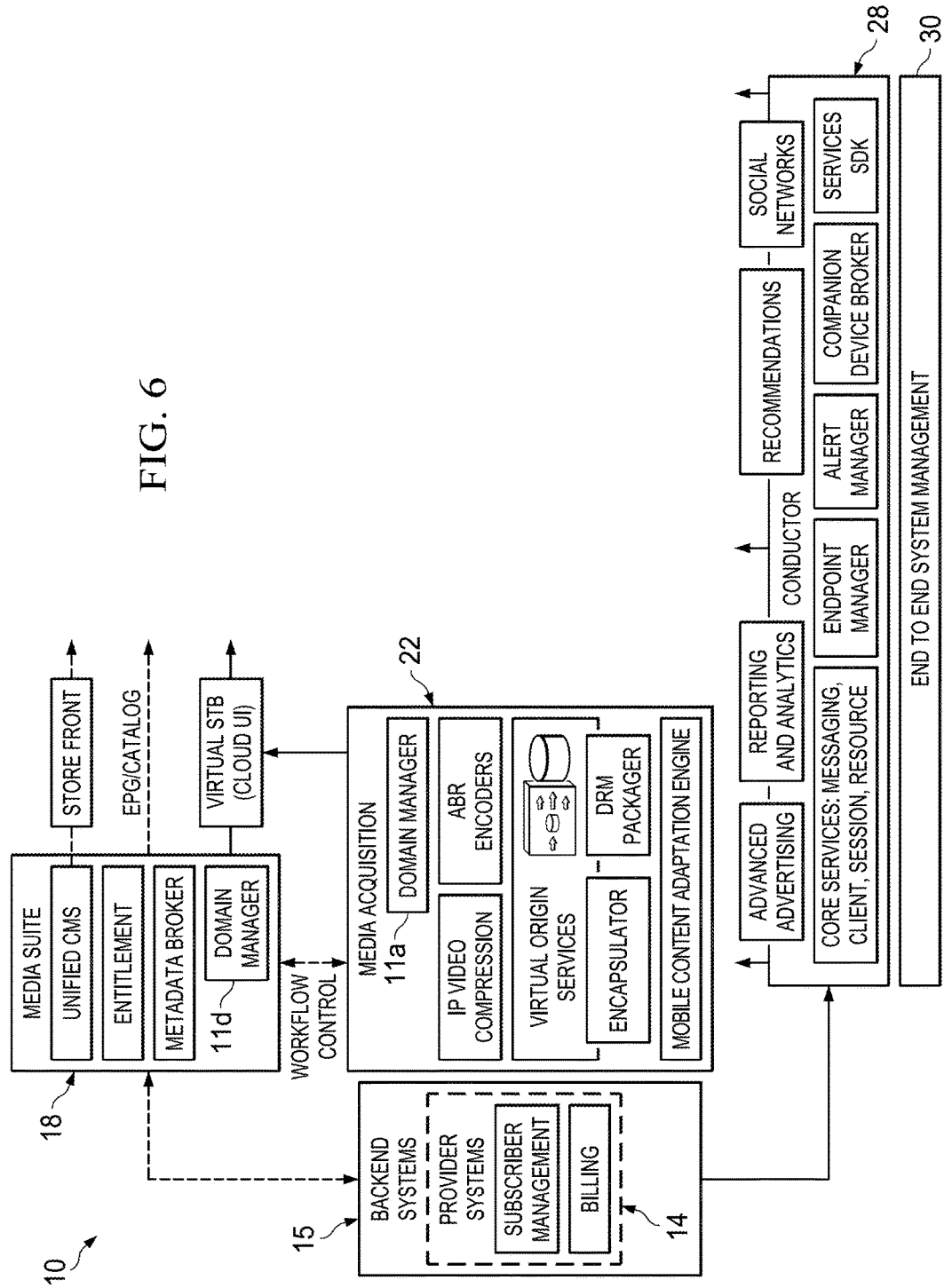
FIG. 6 is a simplified block diagram illustrating possible example details associated with one embodiment of the video system.

FIG. 6 is a simplified block diagram illustrating additional details associated with the media suite, provider systems, etc. The media suite component receives content metadata and electronic program guide (EPG) information from a multitude of content providers that are serving up managed and unmanaged content. The media suite normalizes this information and produces program guides for the associated content. This can involve using the LSMS/EPG manager for mapping content to channels, respecting blackout indications for content in certain regions, determining Digital Rights Management (DRM) to be applied, etc. The program guides typically vary by region based on locally available content, and program guides may vary on a per-user basis as well (personalized program guides). Similar functionality is provided for on-demand content, which can be made available and visible to end-users. Once the associated content is available, the media suite can then publish the program guide and catalog information for that content. The media suite additionally supports a variety of time-shift TV experiences, bridging the linear and on-demand domains; the DVR CMS function can provide content management functions in this regard. The media suite provides a unified entitlement capability, enabling the service provider to provide support for multiple leading DRM ecosystems. Individual assets (on-demand, linear channels, applications), both managed and unmanaged, are combined into offers by the media suite publisher capability. For example, the service provider may choose to provide a unified VOD catalog that contains a mix of actively managed content as well as unmanaged content from aggregators such as Hulu.

Metadata associated with this content can be served by the metadata broker, which also serves metadata associated with program guides and nDVR recordings. Managed content can be acquired, transcoded, encrypted, and delivered by the service provider's infrastructure (acquisition suite), whereas the unmanaged content processing and delivery is the responsibility of the aggregator. Assets from both can be seamlessly merged into unified offers and presented to the user in a common catalog. In the case of managed content, the client can interact with the media suite entitlement management server. If the user is entitled to the content, the content resolution server (CRS) function decides on one or more suitable formats to serve up the content for the client in question; the formats may in turn depend on certain content policies controlled by the content policy function. In the case of unmanaged content, the client will interface directly to the aggregator's backend entitlement/delivery systems at the time of asset playback.

Before a user is permitted to watch certain content, whether it is linear or on-demand, the content can be made available. Unmanaged content is neither cached nor processed by the video system network, but is instead delivered over-the-top (OTT) as any other IP traffic. However, managed content can be acquired from the content provider, and possibly transformed in a multitude of ways. The acquisition suite serves this role by (re)encoding the content in possibly several different formats (codecs, resolutions, etc.) to support a multitude of end-user devices and the adaptive bitrate delivery of said content. VOD transcoding is done by a transcode manager, linear transcoding can be done by the digital content manager (DCM) and media processor, and ABR formatting can be handled by the media encapsulator. Encryption for DRM can also be provided. The acquisition suite and media suite coordinate with each other to determine what content to acquire, when the content is available and, hence, can be published in a catalogue, and which DRM to apply. Once the content has been transformed, it can be stored on the origin server function, and the content is then available for distribution to endpoints. The content can then either be pushed out to the distribution suite (pre-fetching), or the distribution suite will retrieve and cache it when needed.

In spite of the use of HTTP ABR, some content may be served by multicast; the home gateway can translate between multicast delivery and unicast HTTP ABR to optimize access network and CDN (distribution suite) use. The multicast manager advertises statically and potentially dynamically provisioned multicast sessions defining the multicast cloud that determines the multicast senders, as well as the coverage for that multicast tree. The virtual origin service (VOS) embeds capabilities such as encapsulation, time-shifted representations, recording for nDVR, and multicast origination for multicast-cache fill; the service router function enables efficient service routing request handling across multiple VOS instances (e.g., to use a topologically close-by VOS).

Based on the program guide information, VOD catalog, etc., the client can have an HTTP URL for the content it wishes to acquire (e.g., a TV channel, a movie on-demand, etc.). When the client issues a request for said content, it will need to go through an entitlement check to determine if it's allowed to obtain the content requested. The entitlement check is performed by the media suite, which interfaces to the DRM/license servers to obtain DRM ecosystem-specific license keys that enable decryption of the DRM protected content.

The ad suite placement broker accepts advertising placement queries (e.g., in the form of an Society of Cable Telecommunications Engineers (SCTE) 130 Part 3 PlacementRequest message), from any initiating source (be it a client or the cloud). The placement broker gathers additional targeting criteria relative to both the content and the viewer from a combination of internal and external sources. For content specific metadata, the media suite's metadata broker and/or a 3rd party metadata source are queried using the SCTE 130 Content Information Service (CIS) interface. User or content viewer information is obtained from a combination of internal and/or 3rd party sources using the SCTE 130 Subscriber Information Service (SIS) interface. Example SIS metadata sources include video system's geo-location service, conductor's client directory service, indirect access to the service providers subscriber data, or an external 3rd party such as Experian.

One or more placement opportunities (a more generalized form of a traditional linear element that includes metadata describing decision ownership, policy, ad unit structure) can be obtained from a component implementing the SCTE 130 Placement Opportunity Information Service (POIS) interface. Based on ownership and provisioned placement service criteria, the placement broker applies the appropriate metadata visibility policies and routes the individual placement opportunities to the correct advertising decision service. The advertising decision service may be a component of a 3rd party campaign manager or it may be the ad suite's web ADS router. The web ADS router forwards decision requests to a 3rd party web ad decision server such as DoubleClick or Freewheel using their native request format and receives an Interactive Advertising Bureau (IAB) Video Ad Serving Template (VAST) 2.0 response. The placement broker aggregates the sum of advertising placement decisions and returns the result to the initiating source using a SCTE 130 PlacementResponse message. The initiating source then intermixes the entertainment content and the selected advertising assets using the appropriate delivery platform specific assembly mechanism (for example, manifest manipulation for HLS, or player control for client HSS/Smooth, etc.).

The placement reporter acquires media session events including placement, playout, session, viewer, and remote control events, filters these events according to the provisioned placement service policies, and forwards the appropriate confirmation reports to the individual advertising decision services. The web ADS router provides an additional forwarding capability proxying to the VPAID format. The placement reporter also archives the data for later analysis and provides report generation support.

The management suite fulfills the management aspects (FCAPS) of the video system. The device manager performs basic hardware and firmware device management for video system managed devices (i.e., set-top boxes and home gateways, whereas the endpoint manager supports overall management for all video system clients in the form of application download, provisioning, event collection and reporting, etc.). Domain managers are subsystem managers for each product suite. A domain manager is either located in the management suite itself or it is a product in another suite that fulfills a dual role. Finally, the video system manager of managers (MoM) can offer an overall manager for the various management components of the platform.

The video system architecture defines several third-party elements that are not associated with any particular suite. Within the video system box, the Authentication/Authorization/Single-Sign-On (AA/SSO) function provides a common backend AA and SSO solution that allows for common credentials and single sign-on between different suites and interfaces. The accounting function enables storage of accounting data (e.g., for quality statistics), and the DOCSIS and Telco Policy functions provide policy server functions for Cable and Telco access networks. Outside the video system box, a number of third-party elements for 3rd Party web services, service provider BSS/OSS, Content Provider (CP) Control Systems, as well as EPG schedule information, VOD and Linear Content Sources, Integrated Receiver Decoders (IRD), Emergency Alert System (EAS), and Public CDNs are defined as well.

Turning to the example infrastructure associated with present disclosure, the clients of FIG. 1 can be associated with devices, customers, or end-users wishing to receive data or content in video system 10 via some network. The term 'client' is inclusive of devices used to initiate a communication, such as a receiver, a computer, a set-top box, an IRD, a cell phone, a smartphone, a tablet, a personal digital assistant (PDA), a Google droid, an iPhone, an iPad, a remote control, or any other device, component, element, or object capable of initiating voice, audio, video, media, or data exchanges within video system 10. The clients may also be inclusive of a suitable interface to the human user, such as a display, a keyboard, a touchpad, a remote control, or other terminal equipment. The clients may also be any device that seeks to initiate a communication on behalf of another entity or element, such as a program, a database, or any other component, device, element, or object capable of initiating an exchange within video system 10. Data, as used herein in this document, refers to any type of numeric, voice, video, media, or script data, or any type of source or object code, or any other suitable information in any appropriate format that may be communicated from one point to another.

The networks of FIG. 1 can represent a series of points or nodes of interconnected communication paths for receiving and transmitting packets of information that propagate through video system 10. The networks can offer a communicative interface between sources and/or hosts, and may be any local area network (LAN), wireless local area network (WLAN), metropolitan area network (MAN), Intranet, Extranet, WAN, virtual private network (VPN), or any other appropriate architecture or system that facilitates communications in a network environment. A network can comprise any number of hardware or software elements coupled to (and in communication with) each other through a communications medium.

In one particular instance, the architecture of the present disclosure can be associated with a service provider digital subscriber line (DSL) deployment. In other examples, the architecture of the present disclosure would be equally applicable to other communication environments, such as any wireless configuration, any enterprise wide area network (WAN) deployment, cable scenarios, broadband generally, fixed wireless instances, fiber to the x (FTTx), which is a generic term for any broadband network architecture that uses optical fiber in last-mile architectures, and data over cable service interface specification (DOCSIS) cable television (CATV). The architecture of the present disclosure may include a configuration capable of transmission control protocol/internet protocol (TCP/IP) communications for the transmission and/or reception of packets in a network.

Any of the suites, backend systems, the conductor, end to end system management, etc. can be representative of network elements that can facilitate the video management activities discussed herein. As used herein in this Specification, the term 'network element' is meant to encompass any of the aforementioned elements, as well as routers, switches, cable boxes, iPads, end-user devices generally, endpoints, gateways, bridges, STBs, loadbalancers, firewalls, inline service nodes, proxies, servers, processors, modules, or any other suitable device, component, element, proprietary appliance, or object operable to exchange content in a network environment. These network elements may include any suitable hardware, software, components, modules, interfaces, or objects that facilitate the operations thereof. This may be inclusive of appropriate algorithms and communication protocols that allow for the effective exchange of data or information.

In one implementation, these network elements can include software to achieve (or to foster) the video management activities discussed herein. This could include the implementation of instances of domain manager 11a-f. Additionally, each of these elements can have an internal structure (e.g., a processor, a memory element, etc.) to facilitate some of the operations described herein. In other embodiments, these video management activities may be executed externally to these elements, or included in some other network element to achieve the intended functionality. Alternatively, these network elements may include software (or reciprocating software) that can coordinate with other network elements in order to achieve the video management activities described herein. In still other embodiments, one or several devices may include any suitable algorithms, hardware, software, components, modules, interfaces, or objects that facilitate the operations thereof.

Figure 7:
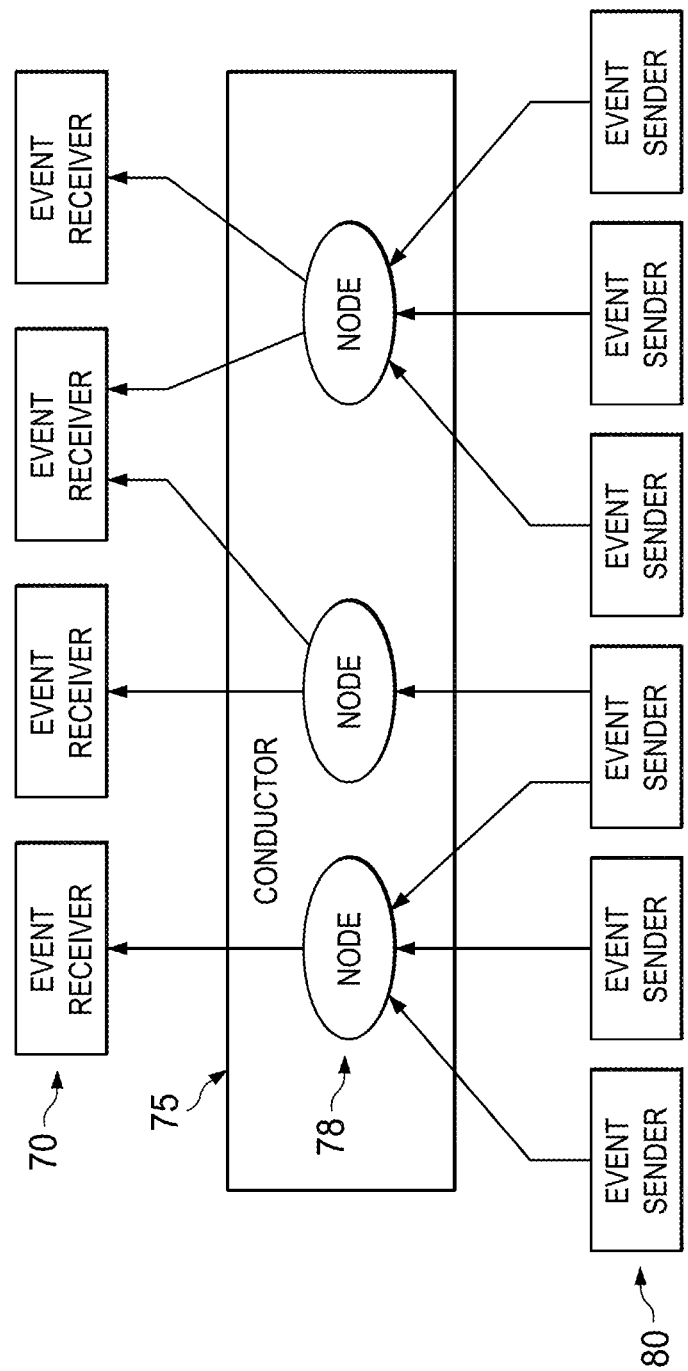
FIG. 7 is a simplified block diagram illustrating event collection activities associated with the present disclosure.

Turning to FIG. 7, FIG. 7 is a simplified block diagram illustrating example components associated with event collection in accordance with a particular embodiment of the present disclosure. The architecture of FIG. 7 can provide a unified solution for system management eventing (e.g., logging, alarming, etc.) based on XMPP PubSub. The solution can be especially applicable to a video services control plane built on XMPP, where a unified treatment of clients and services is provided. Instead of generating events to one or more specific system managers, the architecture can publish such events to specific XMPP PubSub nodes [XEP-0060], which system management entities can subscribe to in order to obtain the events of interest. The platform can define PubSub nodes for this based on functional areas and/or subsystems, and utilize collection nodes to consolidate events of interest and content-based PubSub to filter events of interest. An XMPP service to control the events generated is provided.

In a video services control plane, workflows can be triggered. Additionally, the mechanism can also be used in conjunction with loadbalancing mechanisms. Such an architecture can simplify the configuration and management of the system by having event generaters and event consumers interact indirectly (via a PubSub node). It also provides flexibility in terms of event processing by allowing multiple parties to subscribe to events rather than a single entity being configured to systematically receive them. Subscribers can also change (including near real-time (e.g., for troubleshooting)). The architecture can work through NATs by relying on a persistent connection. Also, the architecture provides for a reliable delivery of events and, therefore, there is no loss of events.

The PubSub supports caching of events and also limited event persistence (e.g., last X events). A currently unavailable management station would not lose events that are delivered. The platform also provides for a secure (TLS) event delivery (e.g., both publish and subscribe). It also provides for authenticated event publishing and subscription by leveraging authenticated Jabber Identifiers (that can be leveraged for both clients and services in the overall architecture). The mechanism is not limited to logging and alarming; it can be generally useful for diagnostics, statistics, etc.

In operation, the architecture can use XMPP PubSub (XEP-0060) as the mechanism to deliver and obtain logging, alarming, etc. system management events, rather than conventional mechanisms such as syslog and SNMP. In accordance with one aspect of the present disclosure, entities in the system have an authenticated identity (an XMPP Jabber Identifier—JID) assigned to them. Entities in the system covers both clients (devices, endpoints, and users) and services in the system. This implies that the entities in the system can be treated as event senders and/or event receivers as shown in FIG. 7.

In other designs, system management events (alarms, statistics, etc.) and logs tend to be siloed and sent to some sort of management system for further processing (and possibly forwarding to other management systems). The target management system is typically configured on the entity generating the event; however, in practice, a multitude of different systems may be interested in varying subsets of events generated. Although SNMP, for example, does provide a way to dynamically specify events of interest, its UDP-centric nature makes it less than ideal for end-user clients. It also does not provide for an integrated identity model, which can make fine-grained access control and correlation with end-user clients challenging.

Embodiments of the present disclosure address these issues by using XMPP PubSub as the system management eventing (alarming, logging, etc.) mechanism in the above mentioned video services control plane and does so in a unified manner for clients and services. Instead of generating events to a system manager, the architecture publishes such events to specific XMPP PubSub nodes [XEP-0060]. One or more system management entities may in turn subscribe to these nodes, thereby, obtaining the events of interest.

One consideration involves how to use these PubSub nodes. In its basic form, each client and each service can have a PubSub node associated with it, to which system management events are published. The authenticated JID associated with clients and services can ensure that only authorized entities publish to specific nodes and, similarly, that only authorized entities (e.g., a system management app) can subscribe to specific nodes. Also considered is which events are generated (types and levels) and how that can be modified. Additionally, consideration is given to whom is to be notified for particular events (not all subscribers may be interested in the same events from a given entity) and how an entity can modify the settings.

In operation, each entity has multiple PubSub nodes, where each node corresponds to a functional area or subsystem. Session management can, for example, be one, and device management another. Collection nodes (XEP-0248) enable a node to contain other nodes or collections. This can provide for an easy way of consolidating multiple functional areas of interest and/or multiple entities of interest and provide a single subscription entity to a manager. Note that like any other PubSub node, collection nodes can be created, modified, and deleted, and that this process can be performed by a management station. Collection nodes provide a way to reduce the number of subscriptions required by an external entity, which (for example) may be important for a management station managing a large number of clients.

For content-based PubSub, a subscriber can specify filters to only be informed about a subset of events associated with a node. Filters could be applied for a severity level associated with an event. Note that the decision as to which nodes to subscribe to and the filter to apply to each of those can be subscriber-specific and, hence, the architecture can support the ability to have multiple parties interested in different subsets of events generated by an entity. Furthermore, the subscriptions and filters can be changed in real-time on a per-subscriber basis without affecting other subscribers or the events generated. Also, nodes can be created, modified, and deleted.

Existing client-based mechanisms for logging simply generate logging data for the level of logging for which they are configured. For a PubSub based system to be resource efficient, and in order to support alarm configuration as well, the architecture should have a mechanism of controlling which events are generated and published. Because there is an existing XMPP infrastructure in place, an XMPP service can be defined to configure this on the entity in question. This can be as simple as mimicking SNMP SetRequest for traps/informs and syslog configuration in XMPP. One of the benefits of using an XMPP PubSub-based approach to eventing is that the architecture can perform this configuration based on whether there are any subscribers to a particular node (or the node supports persistent events). In the absence of a subscriber or event persistence, there is little reason to publish the event in question. Similarly, when filters are used, the architecture should generate events that are only of relevance to the filter. In the case of logging in particular, filters should specify the logging level of interest.

The eventing system can trigger workflows based on certain criteria when receiving events. Several possible criteria can include: trigger workflow for certain nodes; trigger workflow for certain logging security; and trigger workflow for certain publisher. Therefore, an operator can have more flexibility to handle events in different situations.

Another area for this mechanism involves loadbalancing. In an application cluster environment, it is important for a loadbalancer to know each application's load. In other solutions, the loadbalancer communicates with each application to collect load information, or each application reports load information to the loadbalancer. But when the cluster becomes bigger and needs multiple loadbalancers, either mechanism will cause some problems. Using the prior mechanisms would require each loadbalancer to keep collecting load information from each of the applications; therefore, it would increase double, triple, or load more on each application. Additionally, using this prior mechanism would require each application to know each loadbalancer's address, and send load information to every loadbalancer. With the XMPP PubSub-based approach to eventing, these drawbacks are avoided. In particular embodiments, both the loadbalancer and the application simply send or receive one data copy; they do not need to know about each other (just the loadbalancer PubSub node). This saves computing and network resources and simplifies the overall management and operation of the loadbalancing system.

Nodes (i.e., topics) can be flagged as persistent. The eventing system can persist messages sent to these nodes and allow them to be queried later. The event persistence system is simply an additional receiver for the persistent nodes. Messages sent to this node are saved in a persistent data store (optimized for event streams). A query interface is then provided for each persistent node that allows an external system (with appropriate authorization) to query the events for the node by various parameters.

Figure 8:
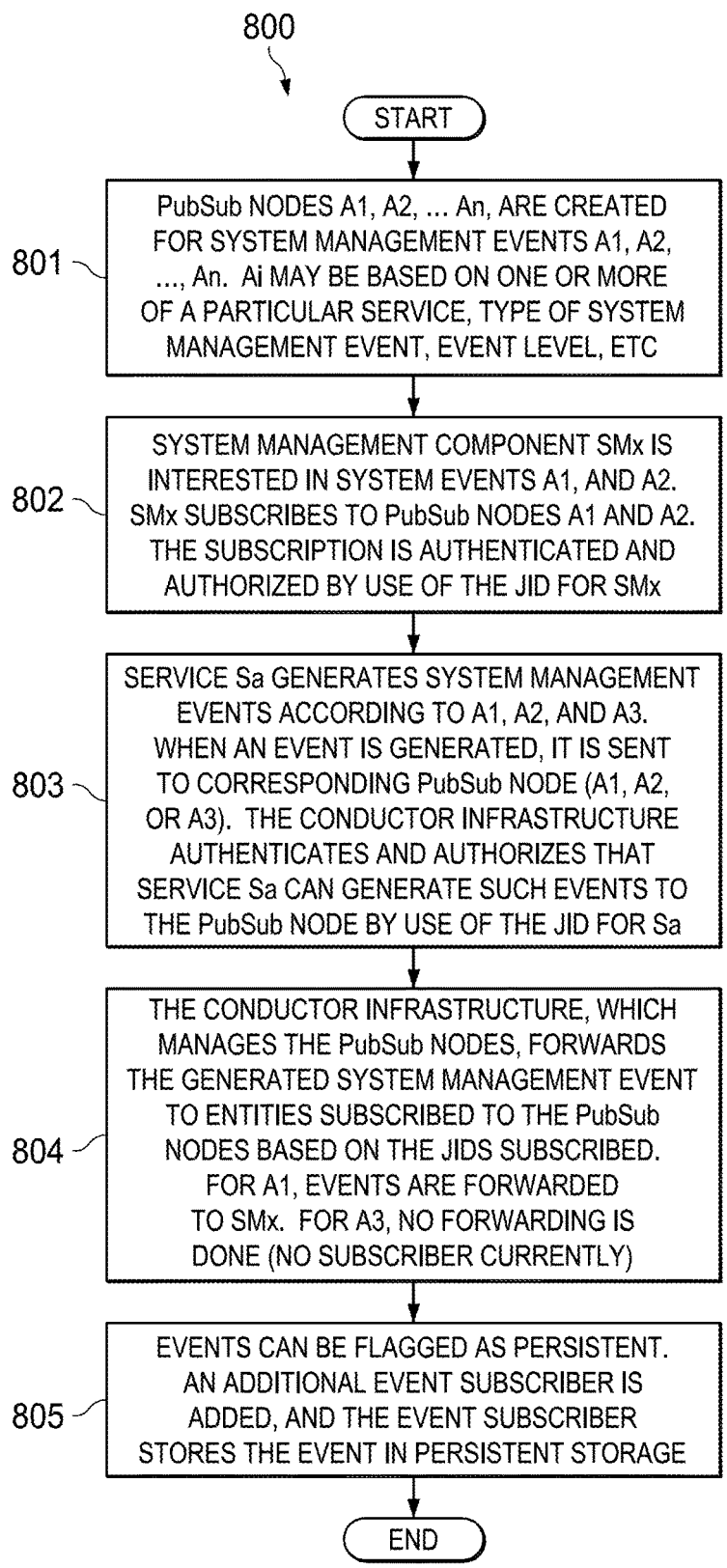
FIGS. 8-9 are simplified flowchart illustrating potential operations associated with the video system.

Turning to FIG. 8, FIG. 8 is a simplified flow diagram 800 illustrating a basic mechanism associated with the present disclosure. This particular flow may begin at 801, where PubSub nodes A1, A2, . . . An, are created for system management events A1, A2, . . . , An. Ai may be based on one or more of a particular service, a type of system management event, an event severity level, etc. At 802, the management component SMx is interested in system events A1, and A2. SMx subscribes to PubSub nodes A1 and A2. The subscription is authenticated and authorized by use of the JID for SMx.

At 803, the service Sa generates system management events according to A1, A2, and A3. When an event is generated, it can be sent to corresponding PubSub node (A1, A2, or A3). The conductor infrastructure authenticates and authorizes that service Sa can generate such events to the PubSub node by use of the JID for Sa. At 804, the conductor infrastructure, which manages the PubSub nodes, forwards the generated system management event to entities subscribed to the PubSub nodes based on the JIDs subscribed. For A1, events are forwarded to SMx. For A3, no forwarding is done (no subscriber currently). Optionally, at 805, events can be flagged as persistent. An additional event subscriber is added, and the event subscriber stores the event in persistent storage.

Figure 9:
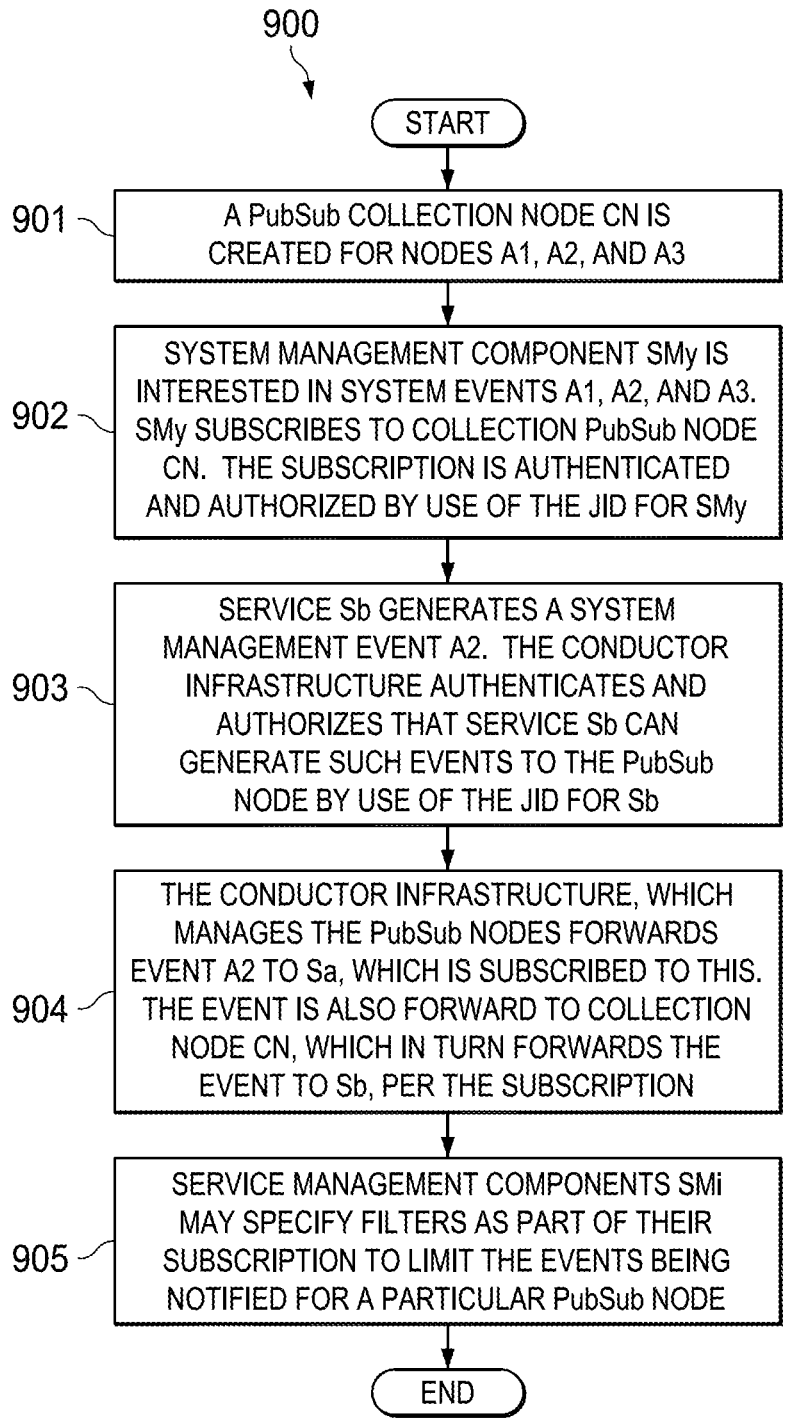

FIG. 9 is a simplified flowchart 900 illustrating an advanced mechanism associated with the present disclosure. This particular flow may begin at 901, where a PubSub collection node CN is created for nodes A1, A2, and A3. At 902, the system management component SMy is interested in system events A1, A2, and A3. SMy subscribes to collection PubSub node CN. The subscription is authenticated and authorized by use of the JID for SMy.

At 903, Service Sb generates a system management event A2. The conductor infrastructure authenticates and authorizes that service Sb can generate such events to the PubSub node by use of the JID for Sb. At 904, the conductor infrastructure, which manages the PubSub nodes, forwards event A2 to Sa, which is subscribed to this. The event is also forwarded to the collection node CN, which in turn forwards the event to Sb, per the subscription. Optionally, at 905, the service management components SMi may specify filters as part of their subscription to limit the events being notified for a particular PubSub node.

As identified previously, a network element can include software (e.g., domain manager 11a-f) to achieve the video management operations, as outlined herein in this document. In certain example implementations, the video management functions outlined herein may be implemented by logic encoded in one or more tangible, non-transitory media (e.g., embedded logic provided in an application specific integrated circuit [ASIC], digital signal processor [DSP] instructions, software [potentially inclusive of object code and source code] to be executed by a processor [processors provided in any of the suites, in conductor 28, in media gateway 34, anywhere in legacy home 38, video system home 34, in backend systems 15, in end to end system management 30, etc.]). In some of these instances, a memory element [provided in any of the suites, in conductor 28, in media gateway 34, anywhere in legacy home 38, video system home 34, in backend systems 15, in end to end system management 30, etc.] can store data used for the operations described herein. This includes the memory element being able to store instructions (e.g., software, code, etc.) that are executed to carry out the activities described in this Specification. The processors can execute any type of instructions associated with the data to achieve the operations detailed herein in this Specification. In one example, the processor could transform an element or an article (e.g., data) from one state or thing to another state or thing. In another example, the activities outlined herein may be implemented with fixed logic or programmable logic (e.g., software/computer instructions executed by the processor) and the elements identified herein could be some type of a programmable processor, programmable digital logic (e.g., a field programmable gate array [FPGA], an erasable programmable read only memory (EPROM), an electrically erasable programmable ROM (EEPROM)) or an ASIC that includes digital logic, software, code, electronic instructions, or any suitable combination thereof.

Any of these elements (e.g., the network elements, etc.) can include memory elements for storing information to be used in achieving the video management operations as outlined herein. Additionally, each of these devices may include a processor that can execute software or an algorithm to perform the video management activities as discussed in this Specification. These devices may further keep information in any suitable memory element [random access memory (RAM), ROM, EPROM, EEPROM, ASIC, etc.], software, hardware, or in any other suitable component, device, element, or object where appropriate and based on particular needs. Any of the memory items discussed herein should be construed as being encompassed within the broad term 'memory element.' Similarly, any of the potential processing elements, modules, and machines described in this Specification should be construed as being encompassed within the broad term 'processor.' Each of the network elements can also include suitable interfaces for receiving, transmitting, and/or otherwise communicating data or information in a network environment.

Note that with the examples provided above, interaction may be described in terms of two, three, or four network elements. However, this has been done for purposes of clarity and example only. In certain cases, it may be easier to describe one or more of the functionalities of a given set of flows by only referencing a limited number of network elements. It should be appreciated that video system 10 (and its teachings) are readily scalable and, further, can accommodate a large number of components, as well as more complicated/sophisticated arrangements and configurations. Accordingly, the examples provided should not limit the scope or inhibit the broad teachings of video system 10, as potentially applied to a myriad of other architectures.

It is also important to note that the steps in the preceding FIGURES illustrate only some of the possible scenarios that may be executed by, or within, video system 10. Some of these steps may be deleted or removed where appropriate, or these steps may be modified or changed considerably without departing from the scope of the present disclosure. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by video system 10 in that any suitable arrangements, chronologies, configurations, and timing mechanisms may be provided without departing from the teachings of the present disclosure.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A method implemented by a conductor element, the method comprising:
   establishing a connection between a client and a messaging fabric of the conductor element, which is associated with a video system;
   receiving a subscription request for a system management event, wherein the subscription request is authenticated and authorized by use of a first identifier of the client;
   receiving from a service the system management event at a publish-subscribe Extensible Messaging and Presence Protocol (XMPP) node managed by the conductor element;
   authenticating and authorizing the system management event using a second identifier of the service; and
   forwarding the system management event to the client, based on the first identifier.

2. The method of claim 1, wherein the XMPP node is configured based on an event severity level.

3. The method of claim 1, further comprising:
   forwarding the system management event to a collection node.

4. The method of claim 1, further comprising:
   storing the system management event in a persistent storage; and
   querying the system management event.

5. The method of claim 1, further comprising:
   forwarding the system management event to a collection node that forwards the system management event based on a subscription.

6. The method of claim 1, further comprising:
   providing a filter at the XMPP node as part of a subscription to limit an event from notifying the client.

7. The method of claim 1, further comprising:
   providing a filter at an event generator as part of a subscription to limit an event from notifying the XMPP node.

8. The method of claim 1, wherein the system management event is received from an application, and the client is to perform one or more load-balancing operations based on the system management event.

9. Logic, encoded in one or more non-transitory media, that includes instructions for execution and, when executed by a processor, is operable to perform operations comprising:
   establishing a connection between a client and a messaging fabric of a conductor element associated with a video system;
   receiving a subscription request for a system management event, wherein the subscription request is authenticated and authorized by use of a first identifier of the client;

receiving from a service the system management event at a publish-subscribe Extensible Messaging and Presence Protocol (XMPP) node managed by the conductor element;

authenticating and authorizing the system management event using a second identifier of the service; and forwarding the system management event to the client, based on the first identifier.

10. The logic of claim 9, the operations further comprising:

forwarding the system management event to a collection node.

11. The logic of claim 9, the operations further comprising:

storing the system management event in a persistent storage; and querying the system management event.

12. The logic of claim 9, the operations further comprising:

forwarding the system management event to a collection node that forwards the system management event based on a subscription.

13. The logic of claim 9, the operations further comprising:

providing a filter at the XMPP node as part of a subscription to limit an event from notifying the client.

14. The logic of claim 9, wherein the system management event is received to perform one or more load-balancing operations.

15. A conductor element, comprising:

a memory element configured to store instructions; and a processor coupled to the memory element, wherein the apparatus is configured to establish a connection between a client and a messaging fabric of the conductor element, which is associated with a video system;

receive a subscription request for a system management event, wherein the subscription request is authenticated and authorized by use of a first identifier of the client, receive from a service the system management event at a publish-subscribe Extensible Messaging and Presence Protocol (XMPP) node managed by the conductor element, authenticate and authorize the system management event using a second identifier of the service, and forward the system management event to the client, based on the first identifier.

16. The conductor element of claim 15, wherein the XMPP node is configured based on an event severity level.

17. The conductor element of claim 15, wherein the apparatus is further configured to flag the system management event as persistent such that the system management event is stored in a persistent storage.

18. The conductor element of claim 15, wherein the apparatus is further configured to forward the system management event to a collection node that forwards the system management event based on a subscription.

19. The conductor element of claim 15, wherein the conductor element creates a node based on a service or a system management event.

20. The conductor element of claim 15, wherein the conductor element receives from the client a specification of a filter.

* * * * *